United States Patent
Kim et al.

(10) Patent No.: US 8,208,974 B2
(45) Date of Patent: *Jun. 26, 2012

(54) METHOD OF PERFORMING ACTIONS RELATED TO HANDOVER BY A MOBILE STATION THAT IS IN POWER SAVING MODE IN A WIRELESS MOBILE COMMUNICATION SYSTEM

(75) Inventors: Beom Joon Kim, Seoul (KR); Ki Seon Ryu, Seoul (KR)

(73) Assignee: LG Electronics Inc., Seoul (KR)

( * ) Notice: Subject to any disclaimer, the term of this patent is extended or adjusted under 35 U.S.C. 154(b) by 275 days.

This patent is subject to a terminal disclaimer.

(21) Appl. No.: 12/686,712

(22) Filed: Jan. 13, 2010

(65) Prior Publication Data

US 2010/0150044 A1    Jun. 17, 2010

Related U.S. Application Data

(63) Continuation of application No. 11/394,514, filed on Mar. 30, 2006, now Pat. No. 7,672,660.

(30) Foreign Application Priority Data

Jun. 9, 2005  (KR) ........................ 10-2005-0049097

(51) Int. Cl.
*H04W 52/38*    (2009.01)
(52) U.S. Cl. ...................... 455/574; 455/343.1; 455/436
(58) Field of Classification Search ........................ None
See application file for complete search history.

(56) References Cited

U.S. PATENT DOCUMENTS

| | | | |
|---|---|---|---|
| 7,130,668 | B2 | 10/2006 | Chang et al. |
| 7,672,660 | B2 * | 3/2010 | Kim et al. .................. 455/343.1 |
| 2004/0071112 | A1 | 4/2004 | Hsu et al. |
| 2005/0054389 | A1 | 3/2005 | Lee et al. |
| 2005/0070340 | A1 | 3/2005 | Kim |

FOREIGN PATENT DOCUMENTS

WO    2005046273    5/2005

OTHER PUBLICATIONS

Tzavidas, S., et al., "Additional Scan Measurement Metric, Triggers and Reporting Modes," IEEE 802.16 Broadband Wireless Access Working Group, IEEE 802.16e-05/219r0, Apr. 27, 2005, XP-002605451.

(Continued)

*Primary Examiner* — Philip Sobutka
(74) *Attorney, Agent, or Firm* — Lee, Hong, Degerman, Kang & Waimey

(57) ABSTRACT

A method of performing actions related to handover by a mobile station (MS) in a wireless mobile communication system is disclosed. More specifically, the MS receives information from a base station (BS), wherein the information includes at least one action for performing handover and at least one condition corresponding to the at least one action. Furthermore, the MS transmits a request message to perform the at least one action based on the received information from the BS and receives a response message in response to the request message. Lastly, the MS performs the at least one action according to the received response message.

22 Claims, 10 Drawing Sheets

OTHER PUBLICATIONS

Kitroser, I., "IEEE 802.16e Handoff Draft," IEEE 802.16 Broadband Wireless Access Working Group, IEEE C802.16e-03/20r1, Mar. 13, 2003.

Tolli, D. et al., "Additional Scan Measurement Metric, Triggers and Reporting Modes," IEEE 802.16 Broadband Wireless Access Working Group, IEEE C802.16e-05/219r1, Jun. 8, 2005.

Yanover, V. et al., "Sleep Mode Generic Mechanism," IEEE 802.16 Broadband Wireless Access Working Group, IEEE C802.16e-04/459r2, Nov. 12, 2004.

Tzavidas, S., et al., "Additional Scan Measurement Metric, Triggers and Reporting Modes," IEEE 802.16 Broadband Wireless Access Working Group, Doc. IEEE C802.16e-05/219r0, Apr. 27, 2005.

* cited by examiner

METHOD OF PERFORMING ACTIONS RELATED TO HANDOVER BY A MOBILE STATION THAT IS IN POWER SAVING MODE IN A WIRELESS MOBILE COMMUNICATION SYSTEM

This application is a continuation of U.S. application Ser. No. 11/394,514, filed Mar. 30, 2006, now U.S. Pat. No. 7,672, 660, which claims benefit of earlier filing date and right to priority to Korean Application No. P10-2005-0049097, filed on Jun. 9, 2005, the contents of which are all hereby incorporated by reference herein in their entirety.

BACKGROUND OF THE INVENTION

1. Field of the Invention

The present invention relates to a performing action related to handover, and more particularly, to a method of performing actions related to handover by a mobile station (MS) that is in power saving mode in a wireless mobile communication system.

2. Discussion of the Related Art

In a broadband wireless access system, a power saving mode or a sleep mode can be used to minimize power consumption of a mobile station (MS). The power saving mode comprises a sleep interval and a listening interval, which are repeated during the operation by the MS. A length (or duration) of the sleep interval is determined by a value of a sleep window. Similarly, a length (or duration) of the listening interval is determined by a value of a listening window. These values are respectively determined based on a characteristic of a determined traffic of a corresponding MS. Furthermore, the MS can be represented by three (3) types of power saving class according to the characteristics of traffic associated with the power saving class.

More specifically, the three power saving class types are classified as a power saving mode class type 1 (hereinafter "Class 1"), a power saving mode class type 2 (hereinafter "Class 2"), and a power saving mode class type 3 (hereinafter "Class 3").

Class 1 can be defined by an initial sleep window, a final window base, a final window exponent, a listening window, and a start frame number of sleep window. Furthermore, Class 1 focuses on features such as Best Effort (BE) which characterizes the existing interne traffic or non-real-time variable rate (nrt-VR).

Class 2 can be defined by an initial sleep window, a listening window, and a start frame number of sleep window. Furthermore, Class 2 focuses on features such as Voice over Internet Protocol (VoIP) and the nrt-VR.

Class 3 can be defined by a final window base, a final window exponent, and a start frame number of sleep window. Furthermore, Class 3 is for periodically transmitting a management message, such as a Downlink Channel Descriptor/Uplink Channel Descriptor (DCD/UCD) and a neighbor advertisement (MOB_NBR_ADV), to the MS that is in power saving mode or alternatively, for data transmitted via multicast transmission.

The above power saving class types describe different types of power saving modes. The operations of these different class types are the basis for handover for the MS to a base station (BS). While in power saving mode, the MS receives signal quality information of neighbor base stations. The signal qualities of neighbor bases stations can be measured by performing scan operation. Before handover operation is performed, a serving BS transmits handover trigger information, which is used in performing handover, to the MS. Here, the serving BS refers to the BS which granted the MS to enter the power saving mode. Using the received handover trigger information, the MS performs handover when the condition specified in the handover trigger information is satisfied.

Even if the MS that is in power saving mode does not transmit and receive a scan request message and a scan response message, respectively, the MS performs scan operation on neighboring base stations and measures signal qualities of neighbor base stations. If the results of the scan operation (e.g., signal qualities of the neighbor base stations, the received signal strength, and/or transmission delay) are transmitted via scan report message to the serving BS every time the scan operation is performed, the power consumption for uplink transmission by the MS increases. At the same time, if the serving BS fails to receive the scan results from the MS operating in power saving mode, then the handover operation of the MS cannot be controlled properly.

SUMMARY OF THE INVENTION

Accordingly, the present invention is directed to a method of performing actions related to handover by a mobile station (MS) that is in power saving mode in a wireless mobile communication system that substantially obviates one or more problems due to limitations and disadvantages of the related art.

An object of the present invention is to provide a method of performing actions related to handover by a mobile station (MS) that is in power saving mode in a wireless mobile communication system.

Another object of the present invention is to provide a method of providing actions related to handover by a base station (BS) for a mobile station (MS) that is in power saving mode in a wireless mobile communication system.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of performing actions related to handover by a mobile station (MS) includes the MS which receives information from a base station (BS), wherein the information includes at least one action for performing handover and at least one condition corresponding to the at least one action. Furthermore, the MS transmits a request message to perform the at least one action based on the received information from the BS and receives a response message in response to the request message. Lastly, the MS performs the at least one action according to the received response message.

In another aspect of the present invention, a method of providing actions related to handover by a base station (BS) for a mobile station (MS) that is in power saving mode includes the MS which transmits information to the MS, wherein the information includes at least one action for performing handover and at least one condition corresponding to the at least one action. Thereafter, the MS receives a request message from the MS asking to perform at least one action based on the received information and transmits response message in response to the request message.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
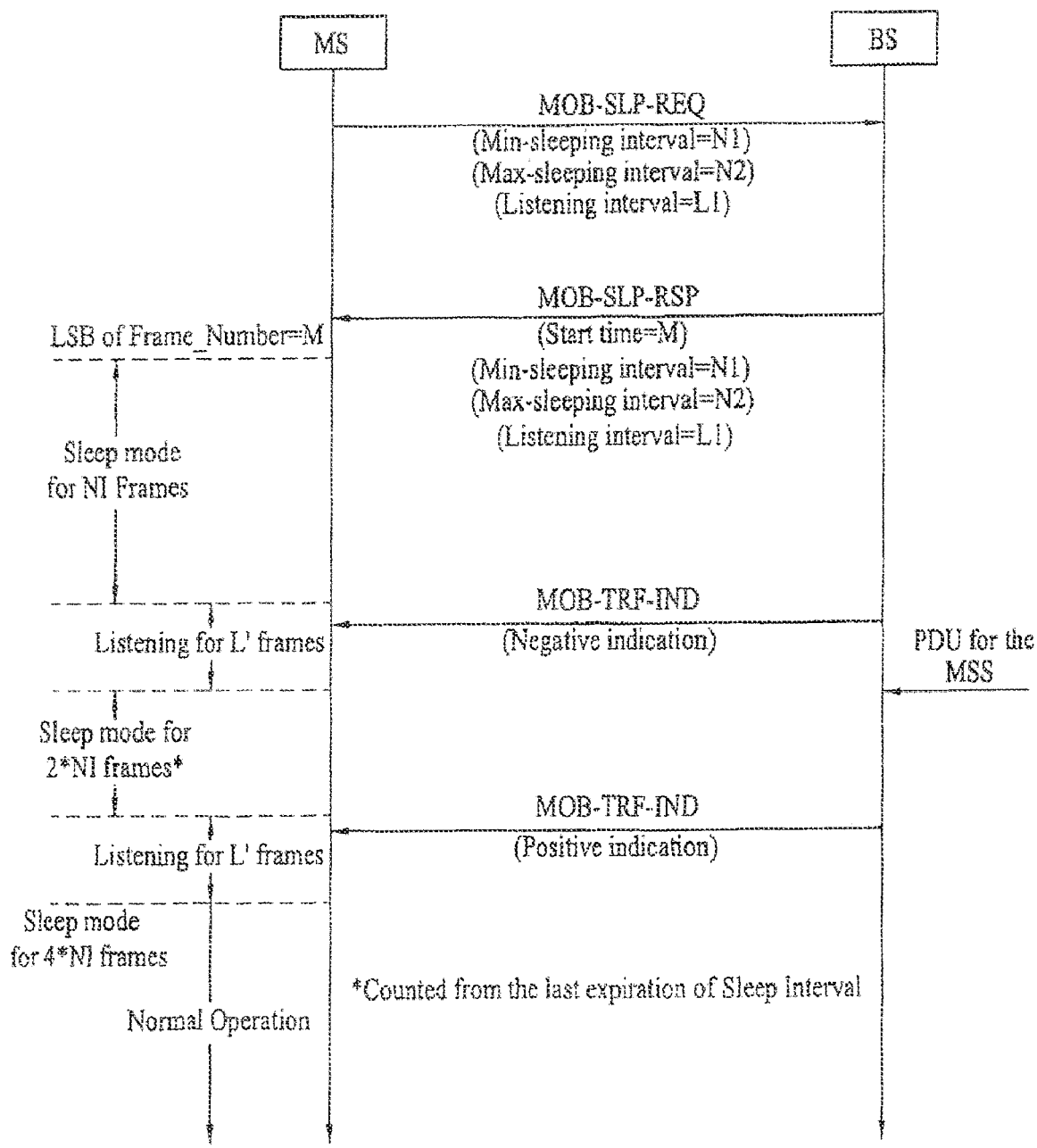
FIG. 1 is an exemplary diagram illustrating processes of a Power Saving Class 1.

Reference will now be made in detail to the preferred embodiments of the present invention, examples of which are illustrated in the accompanying drawings. Wherever possible, the same reference numbers will be used throughout the drawings to refer to the same or like parts.

As discussed above, there are three (3) types of power saving modes. For proper execution of each power saving mode, the BS and the MS exchanges necessary information such as parameters and a ranging response (RNG-RSP) message. The parameters are included in the exchanged messages between the BS and the MS. These messages can be defined by a sleep request (MOB_SLP-REQ) message, a sleep response (MOB_SLP-RSP) message, and a traffic indication (MOB_TRF-IND) message, for example.

Table 1 illustrates an example of the sleep request (MOB_SLP-REQ) message. The sleep request (MOB_SLP-REQ) message includes a request for entry into sleep mode and is one of the messages transmitted by the MS to the serving BS. In the sleep request message, information pertaining to sleep interval(s) and listening interval(s) can be included. Hereinafter, a term 'sleep interval' can be used interchangeably with terms 'sleep window' or 'duration of sleep window.'

TABLE 1

| Syntax | Size | Notes |
|---|---|---|
| MOB_SLP-REQ_Message_Format( ){ | | |
|   Management message type = 51 | 8 bits | |
|   for(i=0; i<Number_of_Classes;i++){ | | |
|     Operation | 1 bit | |
|     Power Saving Class ID | 6 bits | |
|     If(Operation=1){ | | |
|       Start_frame_number | 6 bits | |
|       TRF-IND_Required | 1 bit | |
|       Reserved | 2 bits | |
|     } | | |
|     If(Definition=1){ | | |
|       Power Saving Class Type | 2 bits | |
|       Direction | 2 bits | |
|       initial-sleep window | 8 bits | |

TABLE 1-continued

| Syntax | Size | Notes |
|---|---|---|
|       listening window | 8 bits | |
|       final-sleep window base | 10 bits | |
|       final-sleep window exponent | 3 bits | |
|       Number of CIDs | 3 bits | |
|       for(i=0;i<Number_of_CIDs;i++){ | | |
|         CID | 16 bits | |
|       } | | |
|     } | | |
|   } | | |
| } | | |

Table 2 illustrates an example of the sleep response (MOB_SLP-RSP) message. The sleep response (MOB_SLP-RSP) message includes sleep mode related information and is one of the messages transmitted from the BS to the MS. The sleep response message includes grant of sleep mode along with sleep interval(s), listening interval(s), and sleep identification, for example.

TABLE 2

| Syntax | Size | Notes |
|---|---|---|
| MOB_SLP-RSP_Message_Format( ){ | | |
|   Management message type = 51 | 8 bits | |
|   for(i=0; i<Number_of_Classes;i++){ | | |
|     Definition | 1 bit | |
|     Operation | 1 bit | |
|     Power Saving Class ID | 6 bits | |
|     If(Operation=1){ | | |
|       Start_frame_number | 6 bits | |
|       TRF-IND_Required | 1 bit | |
|       Reserved | 1 bit | |
|     } | | |
|     if(Definition=1){ | | |
|       Power Saving Class Type | 2 bits | |
|       Direction | 2 bits | |
|       initial-sleep window | 8 bits | |
|       listening window | 8 bits | |
|       final-sleep window base | 10 bits | |
|       final-sleep window exponent | 3 bits | |
|       SLPID | 10 bits | |
|       Reserved | 2 bits | |
|       Number of CIDs | 3 bits | |
|       for(i=0;i<Number_of_CIDs;i++){ | | |
|         CID | 16 bits | |
|       } | | |
|     } | | |
|   } | | |
|   If(SHO or FBSS capability enabled){ | 1 bit | |
|     Maintain Active Set and Anchor BS ID | | |
|     If(Active Set and Anchor BS ID maintained) | 3 bits | |
|       SHO/FBSS duration(s) | | |
|     } | | |
|   } | | |
|   Padding | Variable | If needed |
| } | | |

Table 3 is an example of the traffic indication (MOB_TRF-IND) message broadcasted periodically. The MS that is in sleep mode receives the broadcasted traffic indication (MOB_TRF-IND) message during the listening interval and determines whether to maintain the sleep mode, exit the sleep mode to receive downlink data, or perform ranging operation during the sleep mode.

TABLE 3

| Syntax | Size | Notes |
|---|---|---|
| MOB_TRF-IND_Message_Format( ){ | | |
|   Management message type = 52 | 8 bits | |
|   FMT | 1 bit | 0 = SLPID based format<br>1 = CID based format |
|   if(FMT==0) | | |
|     reserved | 7 bits | |
|     SLPID Group Indication bit-map | 32 bits | Nth bit of SLPID-Group indication bit-map [MSB corresponds to N = 0] is allocated to SLPID Group that includes MSSs with SLPID values from N * 32 to N * 32 + 31<br>Meaning of this bit<br>0: There is no traffic for all the 32 MSSs which belong to the SLPID-Group<br>1: There is traffic for at least one MSS in SLPID-Group |
|     Traffic Indication Bitmap | Variable | Traffic Indication bit map comprises the multiples of 32-bit long Traffic Indication unit.<br>A Traffic Indication unit for 32 SLPIDs is added to MOB_TRF-IND message whenever its SLPID Group is set to '1'<br>32 bits of Traffic Indication Unit (starting from MSB) are allocated to MSSs in the ascending order of their SLPID values.<br>0: Negative indication<br>0: Negative indication<br>1: Positive indication |
|   } else { | | |
|   Num-pos | 7 bits | Number of CIDs on the positive indication list |
|   for{i=0;i<Num-pos;i++){ | | |
|     Short Basic CID | 12 bits | 12 least significant bits of the Basic CID |
|   } | | |
|   while(!(byte_boundary)){ | | |
|     padding bits | <== 7 bits | padding for byte alignment |
|     } | | |
|   } | | |
| } | | |

Table 4 illustrates an example of power saving class parameters included in the ranging response (RNG-RSP) message. The power saving class parameters can have variable lengths. That is, the power saving class parameters can be defined as a specific type parameter (e.g., type 21) and can be classified as a compound parameter which can selectively include parameters having varying lengths.

TABLE 4

| Name | Type | Length | Value (Variable-length) |
|---|---|---|---|
| Power_Saving_Class_Parameters | 21 | Variable | Compound TLV to specify Power Saving Class Operation |
| Flags | | 1 bit | Bit 0: Definition<br>1 = Definition of Power Saving Class present<br>Bit 1: Operation<br>1 = Activation of Power Saving Class<br>0 = Deactivation of Power Saving Class (for type 1 and 2 only)<br>Bit 2: TRF-IND_Required For Power Saving Class Type 1 only.<br>1 = BS shall transmit at least one TRF-IND message during each listening window of the Power Saving Class. This bit shall be set to 0 for another types.<br>1 = BS shall transmit at least one TRF-IND message during each listening window of the Power Saving Class. This bit shall be set |

TABLE 4-continued

| Name | Type | Length | Value (Variable-length) |
|------|------|--------|-------------------------|
| | | | to 0 for another types.<br>Bit 3-7: reserved |
| Power Saving Class ID | | 1 bit | Assigned Power Saving Class identifier |
| Power Saving Class Type | | 1 bit | Power Saving Class Type |
| Start frame number | | 1 bit | Start frame number first sleep window |
| initial-sleep window | | 1 bit | initial-sleep window |
| listening window | | 1 bit | Assigned Duration of MS listening interval (measured in frames) |
| final-sleep window base | | 1 bit | Assigned final value for the sleep interval(measured in frames)-base |
| final-sleep window exponent | | 1 bit | Assigned final value for the sleep interval(measured in frames)-exponent |
| SLPID | | 1 bit | A number assigned by the BS whenever an MS is instructed to enter sleep-mode |
| CID | | | CID of connection to be included into the Power Saving Class. There may be several TLVs of this type in a single compound Power Saving Class Parameters TLV |
| Direction | | 1 bit | Direction for management connection which is added to Power Saving Class |

The operation of the MS prior to handover is as follows. First, the MS can perform scan operation. The scan operation allows the MS to acquire signals of the neighbor base stations and measure the signal qualities of the acquired signals to determine the BS having optimum signal quality among the measured signals. To this end, the MS can use a scan request (MOB_SCN-REQ) message to request a serving BS for permission to perform scan operation. In response to the request, the serving BS can send a scan response (MOB_SCN-RSP) message to allow the MS commence scan operation of neighbor base stations to measure signal qualities. In the scan response message, parameters needed for performing scan operation, such as for scan period, can be included.

Table 5 illustrates an example of a scan report (MOB_SCAN-REPORT) message.

TABLE 5

| Syntax | Size (bits) | Notes |
|--------|-------------|-------|
| MOB_SCAN-REPORT_Message_Format( ) { | — | — |
|   Management Message Type = 60 | 8 | — |
|   Report Mode | 12 | 0b00: reserved<br>0b01: Report due to: end of "scan report period"<br>0b10: Report due to: event trigger, using metrics from DCD or MOB_NBR-ADV<br>0b11: reserved |
|   reserved | 5 | Shall be set to zero |
|   Comp_NBR_BSID_IND | 1 | — |
|   if (Comp_NBR_BSID_IND == 1){ | — | — |
|     Configuration Change Count for MOB_NBR_ADV | 8 | Configuration Change Count value of referring MOB_NBR_ADV message |
|   } | — | — |
|   N_current_BSs | 3 | When FBSS/SHO is supported, N_current_BSs is the number of BSs currently in the active set; when FBSS/SHO is not supported or the MS has an empty active set, N_current_BSs is set to 1 (= serving/anchor BS). |
|   Reserved | 35 | Shall be set to zero |
|   For (j=0; j<N_current_BSs; j++) { | — | — |
|     Temp BSID | 4 | Active set member ID assigned to this BS. When the MS has an empty active set or FBSS/SHO is not supported, Temp BSID shall be set to 0. |
|     Reserved | 4 | Shall be set to zero |
|     BS CINR mean | 8 | — |
|     BS RSSI mean | 8 | — |
|     Relative delay / BS RTD | 8 | When FBSS/SHO is supported, this field will include the relative delay of BSs currently in the active set (Anchor BS |

TABLE 5-continued

| Syntax | Size (bits) | Notes |
|---|---|---|
|  |  | relative delay = 0); when FBSS/SHO is not supported, this field will include the RTD of the serving BS. |
| } |  |  |
| N_NEIGHBORS | 8 | — |
| For (i=0; i<N_NEIGHBORS; i++) { | — | — |
|   If (Comp_NBR_BSID_IND == 1){ | — | — |
|     Neighbor BS index | 8 | — |
|   } | — | — |
|   Else{ | — | — |
|     Neighbor BSID | 24 | The least significant 24 bits of the Neighbor BSID |
|   } | — | — |
|   BS CINR mean | 8 | — |
|   BS RSSI mean | 8 | — |
|   Relative delay | 8 | — |
| } | — | — |
| TLV encoded information | variable | Optional |
| } | — | — |

In operation, the MS can use the scan report message, such as the one of Table 5, to transmit information (e.g., signal quality, strength of received signal, transmission delay) acquired from the scan operation of the neighbor base stations to the serving BS. The serving BS determines whether to allow MS to perform handover based on information of neighbor BS scanned results.

A time it takes to perform handover can be shortened by performing association. Association relates to a process or a procedure before performing actual handover. In detail, the MS can first measure signal quality of neighbor base stations via scan operation and execute initial ranging operation. Here, the ranging parameters used during the initial ranging operation can be re-used during actual handover. More specifically, the MS can send the scan request (MOB_SCN-REQ) message to the serving BS to request for connection with the neighbor BS. The serving BS in response can provide parameters (e.g., connection execution time, resource information used at connection) necessary for connecting with the neighbor BS via the scan response (MOB_SCN-RSP) message.

As discussed above, the MS can measure signal qualities of the neighbor base stations by using the scan operation and reports the results of the scan operation, including the measured signal qualities, to the serving BS. Thereafter, the MS compares, using an absolute or relative standard, levels of signal qualities that can be provided by the neighbor base stations to level of the actual signal qualities received from the neighbor base stations. After completing the comparison, the MS and/or the serving BS can determine whether to perform handover.

Conditions or values necessary for the MS to perform various operations can be transmitted with specified parameters, as illustrated in Table 6. Here, the parameters can include information related to operations such as scanning the neighbor base stations, reporting the results of the scan operation, connecting with the neighbor BS, and performing handover with the BS. These specified parameters can then be included in a Downlink Channel Descriptor (DCD) of the serving BS or a neighbor BS advertisement (MOB_NBR-ADV) message, and thereafter, transmitted to the MS from the serving BS.

Table 6 illustrates an example of values of a parameter used to trigger different events.

TABLE 6

| Name | Type (1 byte) | Length | Value | PHY scope |
|---|---|---|---|---|
| CINR trigger | 54 | 3 | Carrier-to-interference-plus-noise ratio is measured |  |
| RSSI trigger | 55 | 3 | Received signal strength is measured |  |
| RTD trigger | 56 | 3 | Round-trip-time is measured |  |

Table 7 illustrates an example of conditions of a parameter used to trigger different events.

TABLE 7

| Name | Type | Length | Value |
|---|---|---|---|
| Function | 54.1.1<br>55.1.1<br>56.1.1 | 4 bits<br>(MSB) | Computation defining trigger condition<br>0x0: reserved<br>0x1: Metric of neighbor BS is greater than absolute value<br>0x2: Metric of neighbor BS is less than absolute value<br>0x3: Metric of neighbor BS is greater than serving BS metric by relative value<br>0x4: Metric of neighbor BS is less than serving BS metric by relative value<br>0x5: Metric of serving BS greater than absolute value<br>0x6: Metric of serving BS less than absolute value<br>0x7-0x15: reserved<br>Note: 0x1-0x4 not applicable for RTD trigger metric |
| Action | 54.1.2<br>55.1.2 | 4 bits<br>(LSB) | Action performed upon reaching trigger condition<br>0x0: reserved |

TABLE 7-continued

| Name | Type | Length | Value |
|------|------|--------|-------|
|  | 56.1.2 |  | 0x1: Respond on trigger with MOB_SCAN-REPORT<br>0x2: Respond on trigger with MOB_MSHO-REQ<br>0x3: On trigger, MS starts neighbor BS scan process by sending MOB_SCAN-REQ<br>0x4: Respond on trigger with MOB_SCN-REQ to perform association<br>0x5-0x15: reserved<br>Note: 0x3 is not applicable when neighbor BS metric are defined. |

FIG. 1 is an exemplary diagram illustrating processes of a Power Saving Class 1. In the Power Saving Class 1 of FIG. 1, the MS sends a message to the BS to request for entry into power saving mode, and the power saving mode is maintained until there is downlink traffic to deliver to the corresponding MS, at which point, the power saving mode is terminated. A more detailed description of the operation is provided below.

In detail, the MS sets the values of initial sleep window, final sleep window, and listening window. These values are then included in the sleep request (MOB-SLP-REQ) message transmitted to the BS to request for entry into power saving mode. When or if the BS grants entry into the power saving mode, the BS includes, inter alia, an initial sleep window, a final sleep window, a listening window, and a start frame of the initial sleep window in the response message (i.e., MOB-SLP-RSP) to the corresponding MS.

When the MS enters the power saving mode, the MS remains in the power saving mode for duration equaling duration of the initial sleep window. After the expiration of the power saving mode, the MS receives traffic indication (MOB-TRF-IND) message(s) from the BS during the listening interval. If there is no downlink traffic or data directed to the corresponding MS, referred to as negative indication, for example, then the MS re-enters power saving mode. However, this time, the duration of the power saving mode is twice longer than the previous duration.

If there continues to be no downlink traffic for the corresponding MS during the listening interval(s), then the duration of the subsequent power saving mode increases by a specified rate (i.e., two folds) each time the MS re-enters the power saving mode after failing to receive downlink traffic after the listening interval. The following equation is an example illustrating increase in duration of the power saving mode. Here, a size or duration of a final sleep window can be determined using a final sleep window base and a final window exponent included in the sleep response message.

$$\text{Final Sleep Window} = \text{Final Sleep Window Base} * 2^{\text{Final Window Exponent}} \qquad \text{[Equation 1]}$$

On the contrary, if there is downlink traffic addressed to the MS during the listening interval, indicated as positive indication, then the MS terminates the power saving mode.

Figure 2:
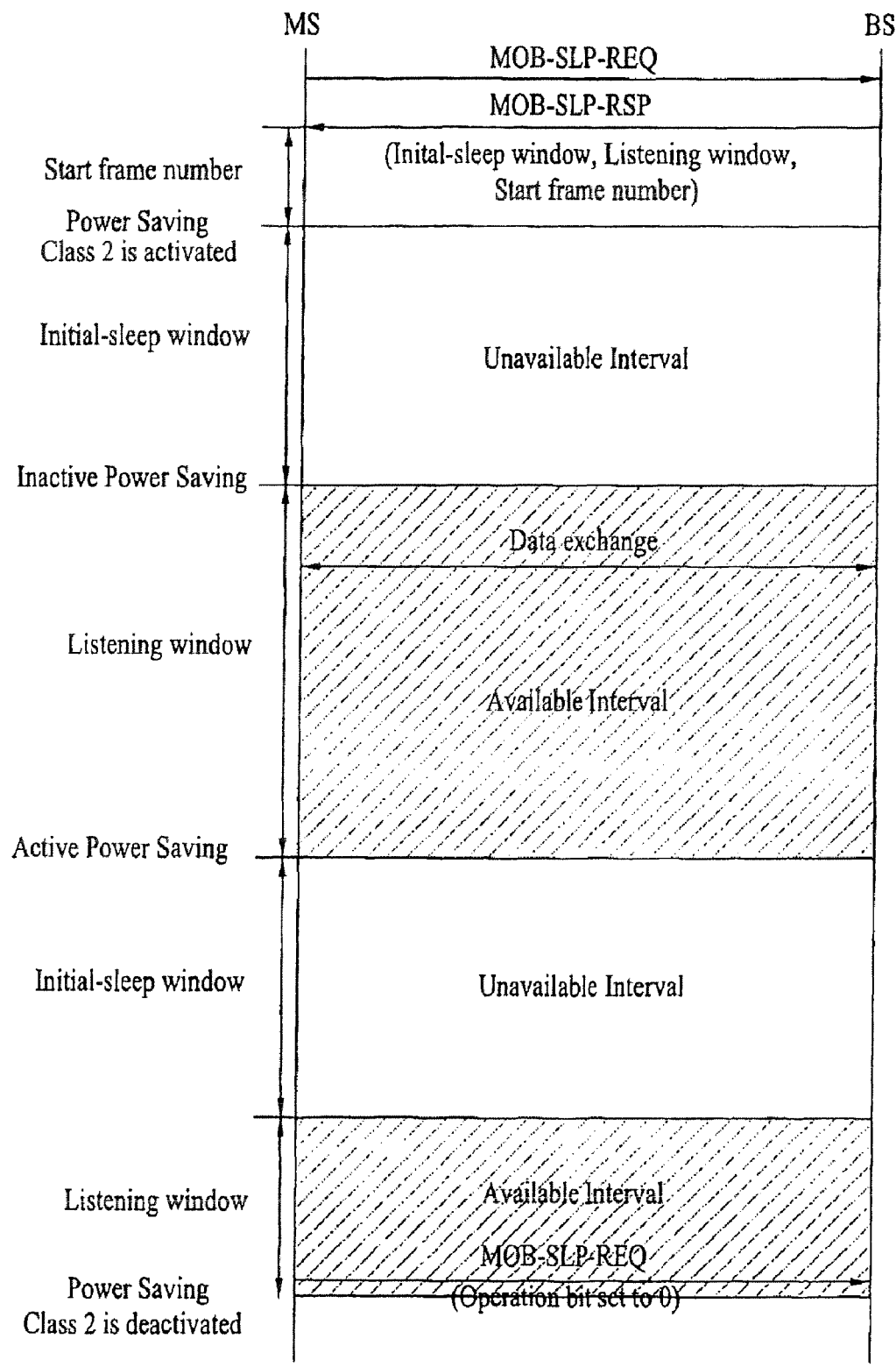
FIG. 2 is an exemplary diagram illustrating processes of a Power Saving Class 2.

FIG. 2 is an exemplary diagram illustrating processes of a Power Saving Class 2. In FIG. 2, the diagram shows the MS using any one of an Unsolicited Grant Service (UGS), which provides a fixed data rate, and a Real Time Variable Service (RT-VR), and the operation processes of the MS in a Power Saving Class 2.

More specifically, the MS transmits a sleep request message, similar to the message of Table 1, to the BS to request for entry to Power Saving Class 2. Upon receipt of the request message, the BS grants entry to Power Saving Class 2 by sending a response message to the MS. The response message can include a sleep interval, a listening interval, and a start frame of the power saving mode to be configured by the MS. Once the MS enters the start frame, the MS stays in the power saving mode for the duration of the sleep interval.

After the sleep interval expires, the MS synchronizes with the BS to maintain uplink/downlink communication. The MS can then receive downlink data from the BS and at the same time, transmit uplink data to the BS during the listening interval. Once the listening interval ends, the MS maintains the power saving mode for a period equaling that of the sleep interval in order to minimize power consumption. Thereafter, the listening and sleep intervals are repeated by the MS in Power Saving Class 2.

If the MS wishes to terminate Power Saving Class 2, the MS can send a sleep request message, including a request to terminate Power Saving Class 2, to the BS during the listening interval. Alternatively, the MS can transmit a user data to the BS during the sleep interval. After Power Saving Class 2 is terminated, the MS is in normal operating mode.

Figure 3:
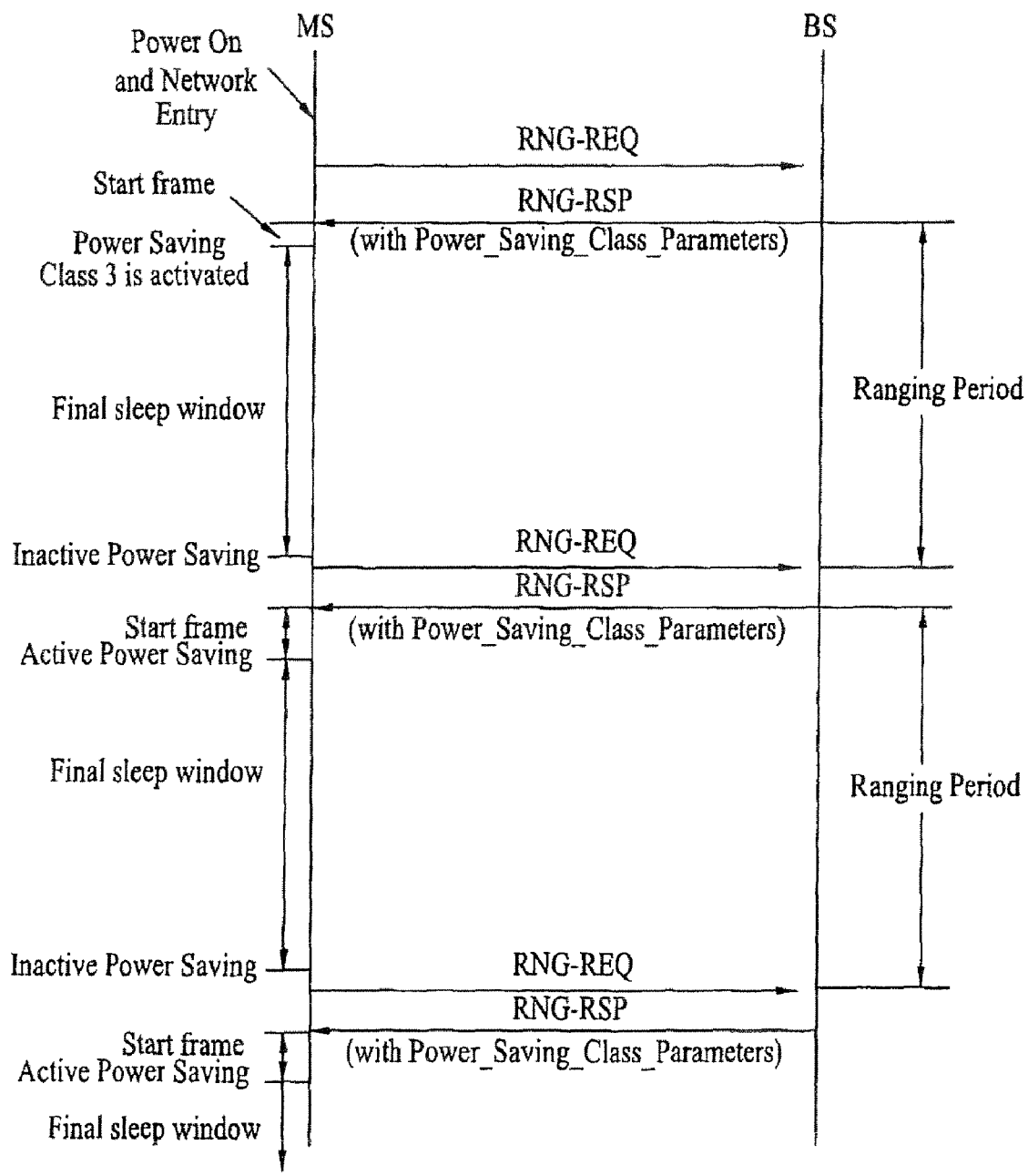
FIG. 3 is an exemplary diagram illustrating processes of a Power Saving Class 3.

FIG. 3 is an exemplary diagram illustrating processes of a Power Saving Class 3. More specifically, FIG. 3 shows the processes of Power Saving Class 3 by illustrating the MS maintaining uplink/downlink communication with the BS and performing ranging operations with the BS to reduce power consumption. In FIG. 3, the MS enters normal operation mode by powering on and executing network entry procedure. During normal mode, the MS performs ranging operations periodically to maintain uplink/downlink communication with the BS. In the process of periodic ranging operations, the MS acquires appropriate uplink transmission parameters. Furthermore, when it is time for the MS to perform periodic ranging operations, the MS transmits a ranging request (RNG-REQ) message to the BS.

After receiving the ranging request message (RNG-REQ) from the MS, the BS responds by transmitting a ranging response (RNG-RSP) message, which includes adjusted values of the uplink transmission parameters, to the corresponding MS. Here, the ranging response message can include sleep window and start frame, for example, so that Power Saving Class 3 can be activated.

After the MS receives the ranging response (RNG-RSP) message, which includes information necessary to activate powering saving mode, the MS encounters the start frame to indicate start of the power saving mode. Thereafter, the MS stays in the power saving mode for the duration of the sleep window. When the sleep window period expires, the MS is in a mode which allows the MS to communicate with the BS. The MS then performs periodic ranging operation. During the ranging operation, the MS receives from the BS the ranging response (RNG-RSP) message including the parameters related to uplink transmission and power saving mode. When it is time to enter power saving mode, the MS enters (or activates) the power saving mode and remains in the power saving mode for the duration of the sleep window.

Figure 4:
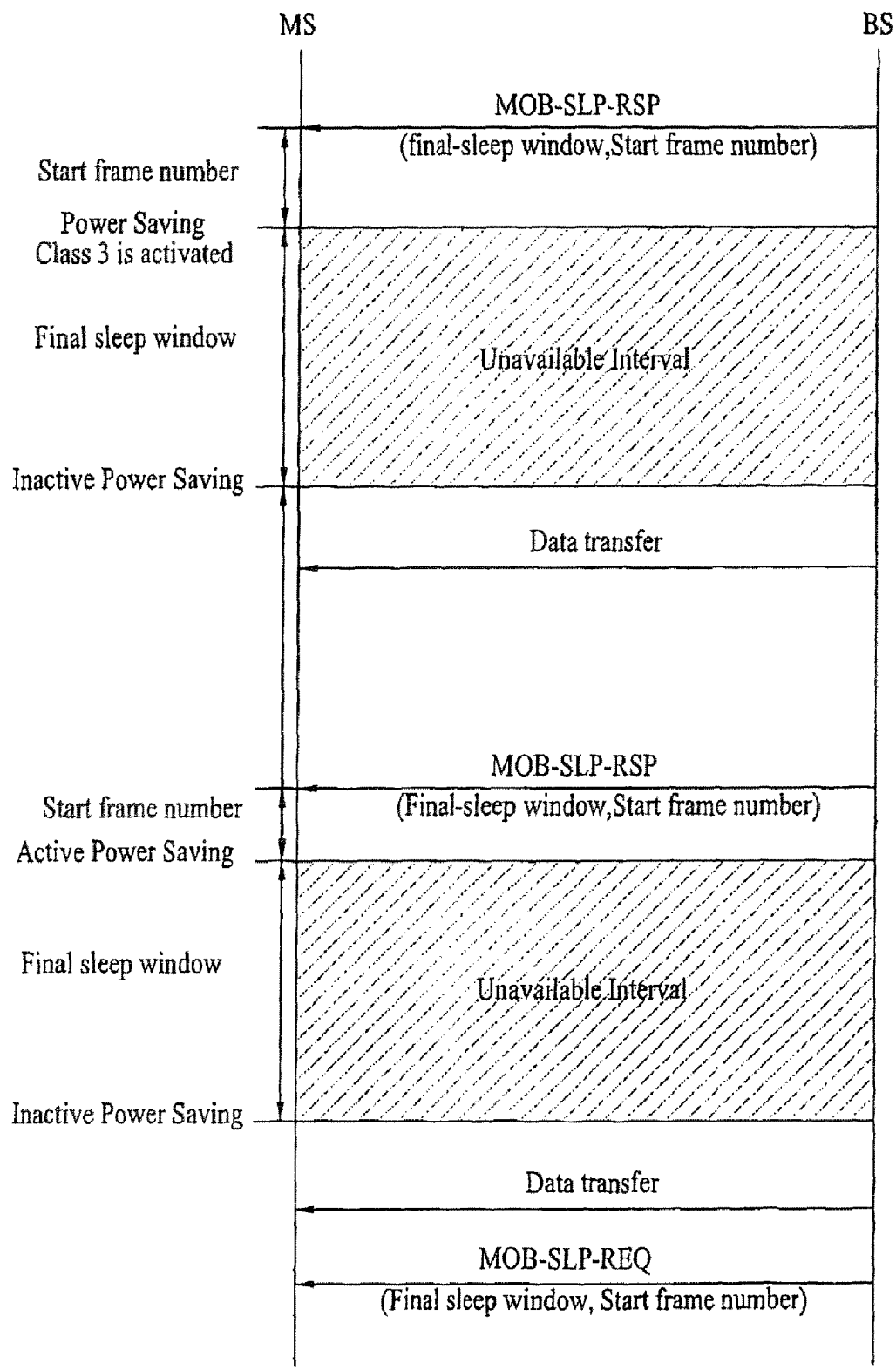
FIG. 4 is another exemplary diagram illustrating processes of a Power Saving Class 3.

FIG. 4 is another exemplary diagram illustrating processes of a Power Saving Class 3. FIG. 4 depicts the processes of Power Saving Class 3 employed by the MS, which receives data from the BS via multicast connection, to conserve power.

The BS transmits a sleep response (MOB_SLP-RSP) message to the MS to have the MS activate Power Saving Class 3. When the MS receives the sleep response (MOB_SLP-RSP) message, starting with the start frame, the MS enters or activates the sleep window and remains in the power saving mode for the duration of the sleep window. At the termination of the sleep window, the MS resumes a mode in which the MS is available to communicate with the BS, and the MS receives data from the BS via multicast connection.

After the BS finishes transmitting data during multicast connection, the BS activates Power Saving Class 3 by transmitting a sleep response (MOB_SLP-RSP) message to the MS so that the power consumption can be reduced until the next data transmission via multicast connection. As for the MS, the MS responds to the sleep response (MOB_SLP-RSP) message by entering the power saving mode for the duration of the sleep window. In order to reduce power consumption of the MS in the broadband wireless access system, each connection may be associated with an individual context or power saving class according to service type of the connection.

Figure 5:
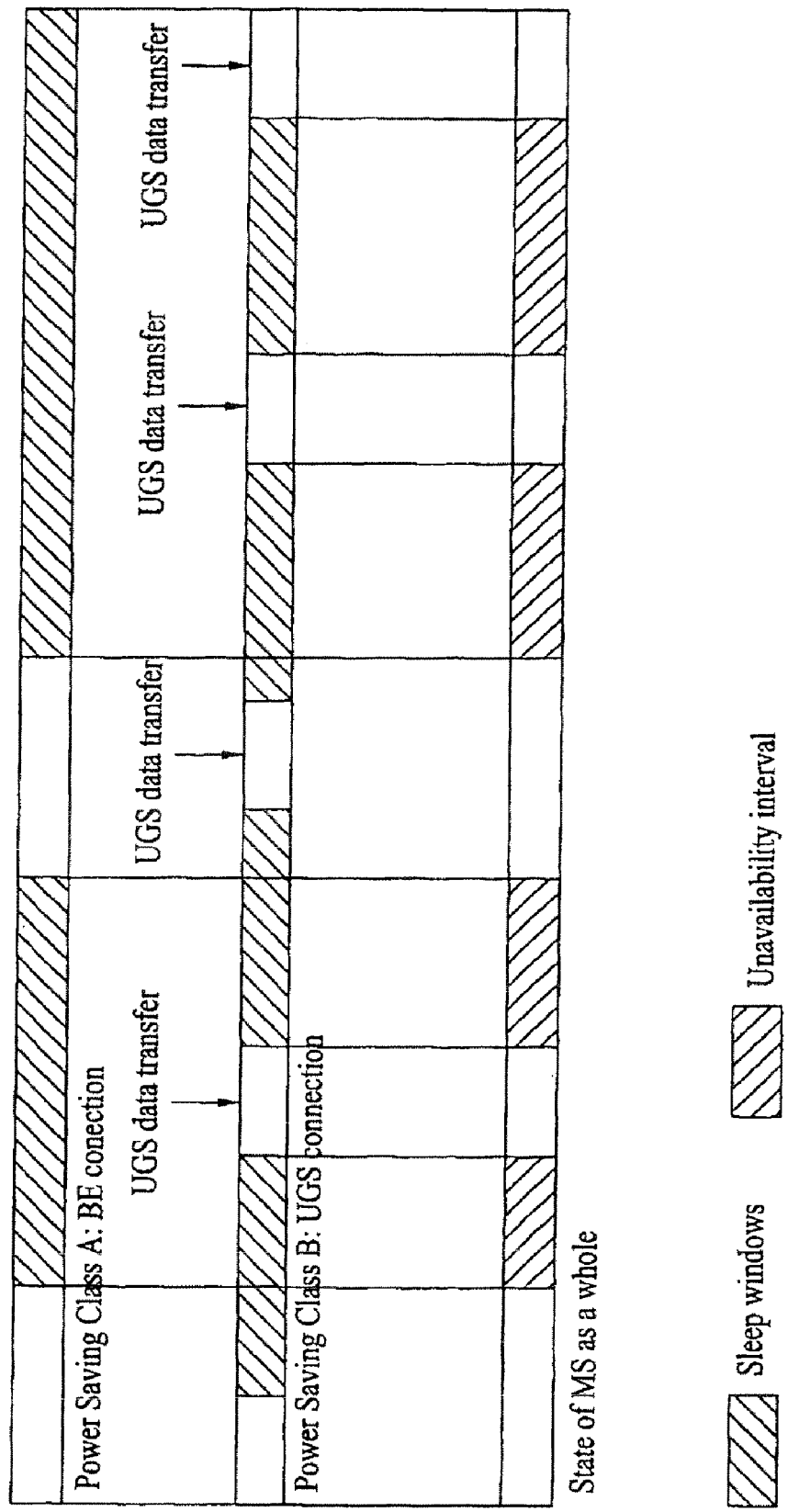
FIG. 5 shows an example of power saving modes of the MS illustrating various service types.

FIG. 5 shows an example of power saving modes of the MS illustrating various service types. As illustrated in FIG. 5, the MS that has at least one power saving class activated remains in the power saving mode during sleep windows where the sleep windows overlap between each power saving class. As described above, the MS does not perform uplink transmission with the BS during power saving mode.

As described above, the MS and the serving BS activates the power saving mode based on each connection represented by a service type. As such, the MS can minimize power consumption. Alternatively, the MS, even during power saving mode, can perform pre-handover operations before handover, such as scan operation which detects signal quality levels received from neighbor base stations, and association procedures which executes ranging operations with the BS prior to performing actual handover, during the sleep window.

The serving BS transmits handover trigger information, which includes operations such as scan, association, and handover, to the MS. As for the MS, the MS performs necessary and appropriate operations when the situation satisfies the condition based on the received handover trigger information.

Figure 6:
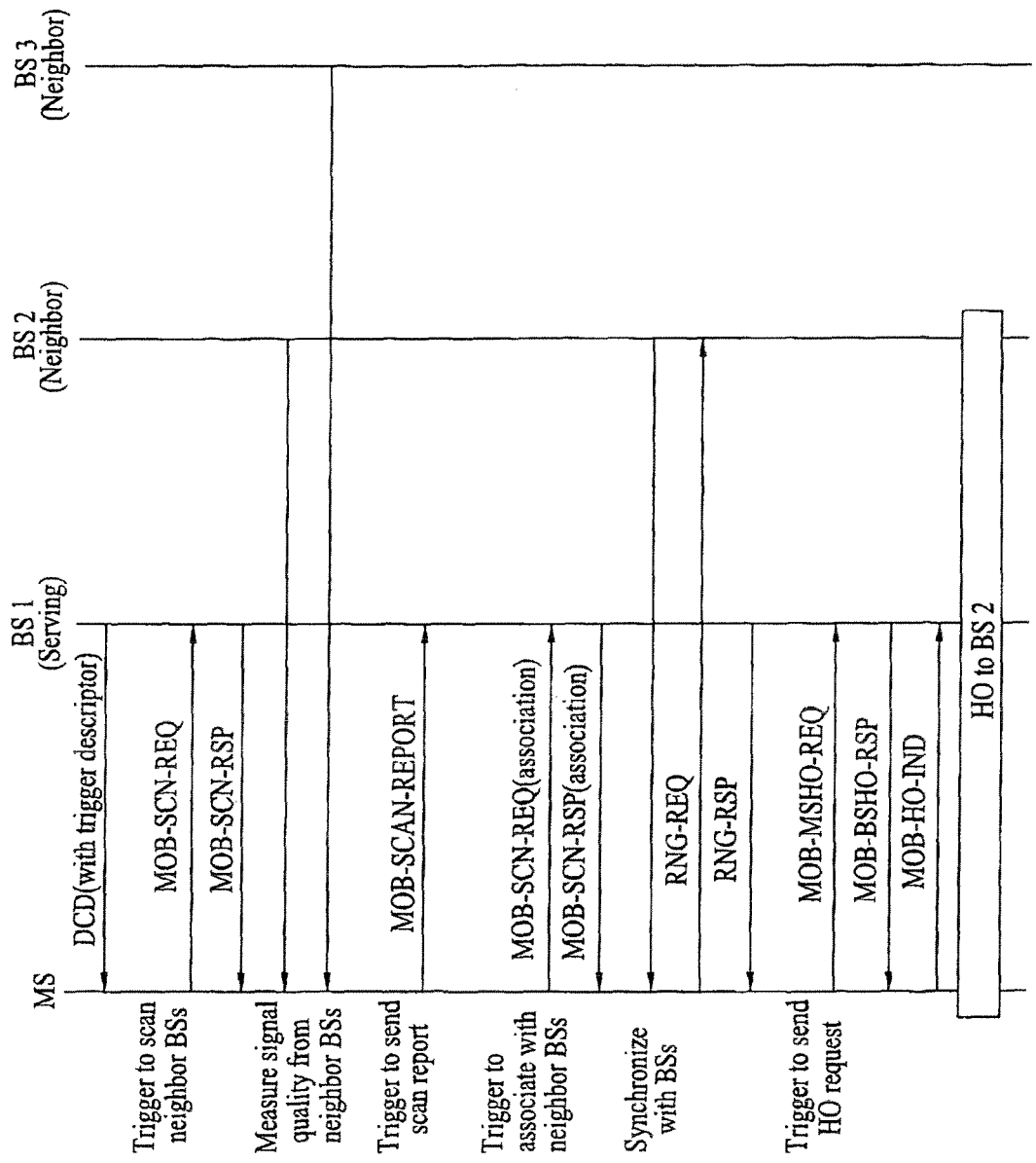
FIG. 6 is an exemplary diagram illustrating handover processes by the MS.

FIG. 6 is an exemplary diagram illustrating handover processes by the MS. In FIG. 6, the serving BS transmits handover trigger information by using the DCD, which is a message used to transmit channel information parameters, or a neighbor advertisement (MOB_NBR-ADV) message. As described above, the handover trigger information includes information necessary for the MS to carry out handover operation.

After the MS receives the handover trigger information from the serving BS, the MS can send a scan request (MOB_SCN-REQ) message to request assignment of scan period (or duration) from the serving BS when the condition is met to perform scan on neighbor base stations.

After receiving the scan request message, the serving BS allocates the scan period (or duration) included in the scan response (MOB_SCN-RSP) message. During the scan period, the MS synchronizes downlink signal with the neighbor BS and measures signal quality, signal strength, and transmission synchronization, among others.

After the MS completes scan, if the MS has to send the scan result of neighbor base stations to the serving BS, the MS uses the scan report (MOB_SCAN-REPORT) message. More specifically, the scan report includes information such as a Carrier-to-Interference and Noise Ratio (CINR), a Received Signal Strength Indicator (RSSI), and a Round Trip Delay.

If the MS has to perform association with the neighbor BS, the MS can transmit a scan request (MOB-SCN-REQ) message to request association with the neighbor BS to the serving BS. In response, the serving BS transmits via a scan response (MOB-SCN-RSP) message parameters necessary for performing association with the neighbor BS. After receiving the necessary parameters, the MS performs association with the neighbor BS.

After the MS performs scan or association operations, if the MS has to perform handover operation with a particular BS after referring to a handover trigger information, the MS can use a handover request (MOB_MSHO-REQ) message to request for handover to the serving BS. Upon receipt, the serving BS transmits a handover response (MOB_MSHO-RSP) message to the MS. Thereafter, the MS transmits a handover indication (MOB_HO-IND) message to the serving BS to request to cease or sever connection with the serving BS. Then, the MS performs operations for re-entry to target BS and the network.

Table 8 is an example of a sleep request (MOB_SLP-REQ) message.

TABLE 8

| Syntax | Size (bits) | Notes |
| --- | --- | --- |
| MOB_SLP-REQ_Message_Format( ) { | ? | ? |
| Management message type = 51 | 8 | ? |
| Number of Classes | 8 | Number of power saving classes. |
| for (i=0; i< Number of Classes; i++) { | ? | ? |
| Definition | 1 | ? |
| Operation | 1 | ? |
| Power_Saving_Class_ID | 6 | ? |
| if (Operation = 1) { | ? | ? |
| Start_frame_number | 6 | ? |
| Reserved | 2 | ? |
| } | ? | ? |
| if (Definition = 1) { | ? | ? |
| Power_Saving_Class_Type | 2 | ? |
| Direction | 2 | ? |
| Traffic_triggered_wakening_flag | 1 | ? |
| reserved | 3 | ? |
| initial-sleep window | 68 | ? |
| listening-window | 4 | ? |
| final-sleep window base | 10 | ? |
| final-sleep window exponent | 3 | ? |

TABLE 8-continued

| Syntax | Size (bits) | Notes |
|---|---|---|
| Number_of_Sleep_CIDs | 3 | ? |
| for (i=0; i<Number_of_Sleep_CIDs; i++ { | ? | ? |
| CID | 16 | ? |
| } | ? | ? |
| } | ? | ? |
| Enabled-Trigger | 4 bits | Bit #0: Respond on trigger with MOB_SCAN-REPORT<br>Bit #1: Respond on trigger with MOB_MSHO-REQ<br>Bit #2: On trigger, MS starts neighbor BS scan process by sending MOB_SCAN-REQ<br>Bit #3: Respond on trigger with MOB_SCN-REQ to perform association |
| ) | | |
| TLV encoded information | variable | ? |
| } | ? | ? |

If the MS wishes to convert to or enter power saving mode, the MS can make a request for entry to power saving mode by transmitting the sleep request (MOB_SLP-REQ) message. Here, the sleep request (MOB_SLP-REQ) message can include information related to whether the MS that is in the power saving mode should perform each handover-related operations for handover trigger information.

The information related to whether the MS that is in the power saving mode should perform each handover-related operations for handover trigger information can be transmitted via a specified field of the sleep request (MOB_SLP-REQ) message. Table 9 is an example of the specified field, labeled as 'Enabled-Trigger' field, of the sleep request (MOB_SLP-REQ) message. In detail, Table 9 describes an example of a parameter for enabling the event trigger operation.

TABLE 9

| Name | Type | Length | Value |
|---|---|---|---|
| Enabled-Trigger | mm | 1 byte | Indicates action performed upon reaching trigger condition in Sleep Mode<br>If bit#0 is set to 1, respond on trigger with MOB_SCAN-REPORT<br>If bit#1 is set to 1, respond on trigger with MOB_MSHO-REQ<br>If bit#2 is set to 1, on trigger, MS starts neighboring BS scan process by sending MOB_SCN-REQ<br>If bit#3 is set to 1, respond on trigger with MOB_SCN-REQ to perform association<br>bit#4-bit#7: reserved. Shall be set to 0. |

The parameter of Table 9 is a Type Length Value (TLV) parameter, which can be transmitted to the BS via a sleep request (MOB_SLP-REQ) message or a ranging request (RNG-REQ) message. More specifically, the parameters of Table 9 can be used to negotiate whether each event is enabled or disabled when the MS enters the power saving mode. Furthermore, the parameters of Table 9 can be included in sleep request (MOB_SLP-REQ), sleep response (MOB_SLP-RSP), ranging request (RNG-REQ), and ranging response (RNG-RSP) messages.

The Enabled-Trigger parameter can be in a bitmap format. The Enabled-Trigger parameter in the bitmap format can be used to notify the serving BS that the corresponding event is to be triggered by the MS. In operation, the MS can configure each bit as '1' (e.g., bit=1), and transmit the configure bit(s) to the serving BS via the sleep request (MOB_SLP-REQ) message. Based on the handover trigger information, if the event trigger condition is satisfied with respect to the event configured to '1' during the power saving mode of the MS, then the serving BS can be notified that the MS is to trigger the corresponding event.

If the serving BS receives the sleep request (MOB_SLP-REQ) message including the enabled-trigger parameter, the serving BS can configure the Enabled-Trigger parameter, as illustrated in Table 9, and can transmit the configured information to the MS via the sleep response (MOB_SLP-RSP) message. Alternatively, the sleep response (MOB_SLP-RSP) message can include the Enabled-Trigger parameter configured according to Table 10.

Table 10 is an example of a sleep response (MOB_SLP-RSP) message.

TABLE 10

| Syntax | Size (bits) | Notes |
|---|---|---|
| MOB_SLP-RSP_Message_Format( ) { | — | — |
| Management message type = 51 | 8 | — |
| Number of Classes | 8 | Number of power saving classes. |
| for (i = 0; i < Number_of_Classes; i++){ | — | — |
| Length of Data | 8 | — |
| Definition | 1 | — |
| Operation | 1 | — |
| Power_Saving_Class_ID | 6 | — |
| if (Operation = 1) { | — | — |
| Start_frame_number | 6 | — |

TABLE 10-continued

| Syntax | Size (bits) | Notes |
|---|---|---|
| Reserved | 2 | — |
| } else { | ? | — |
| REQ-duration | 8 | — |
| } | — | — |
| if (Definition = 1) { | — | — |
| Power_Saving_Class_Type | 2 | — |
| Direction | 2 | — |
| if (Sleep-approved == 0) { | — | — |
| REQ-duration | 8 | — |
| } | ? | — |
| initial-sleep window | 8 | — |
| listening window | 8 | — |
| final-sleep window base | 10 | — |
| final-sleep window exponent | 3 | — |
| TRF-IND required | 1 | — |
| Traffic_triggered_wakening_flag | 1 | — |
| Reserved | 1 | — |
| if(TRF-IND required) { | — | — |
| SLPID | 10 | — |
| Reserved | 2 | — |
| } | — | — |
| Number_of_CIDs | 4 | — |
| for (i = 0; i < Number_of_CIDs; i++) { | — | — |
| CID | 16 | — |
| } | — | — |
| if(SHO or FBSS capability enabled) { | — | — |
| Maintain Active Set and Anchor BS ID BSID | 1 | — |
| if (Maintained Active Set and Anchor BS ID BSID) { | — | — |
| SHO/FBSS duration(s) | — | — |
| } | — | — |
| } | — | — |
| Enabled-Trigger | 4 bits | Bit #0: Respond on trigger with MOB_SCAN-REPORT<br>Bit #1: Respond on trigger with MOB_MSHO-REQ<br>Bit #2: On trigger, MS starts neighbor BS scan process by sending MOB_SCAN-REQ<br>Bit #3: Respond on trigger with MOB_SCN-REQ to perform association |
| } | — | — |
| Padding | variable | If needed for alignment to byte boundary |
| if (Operation = 1) { | — | — |
| Power Saving Class TLV encoded information | — | — |
| } | — | — |
| } | — | — |
| TLV encoded information | — | — |
| } | — | — |

The Enabled-Trigger parameter included in the sleep response (MOB_SLP-RSP) message is in a bitmap format, as in the case with the sleep request (MOB_SLP-REQ) message. Similarly, if each bitmap is set to '1,' and if the trigger condition is satisfied based on the handover trigger information similar to that of Table 7 during power saving mode of the MS, the serving BS notifies the MS to instruct the MS to trigger the corresponding event.

Figure 7:
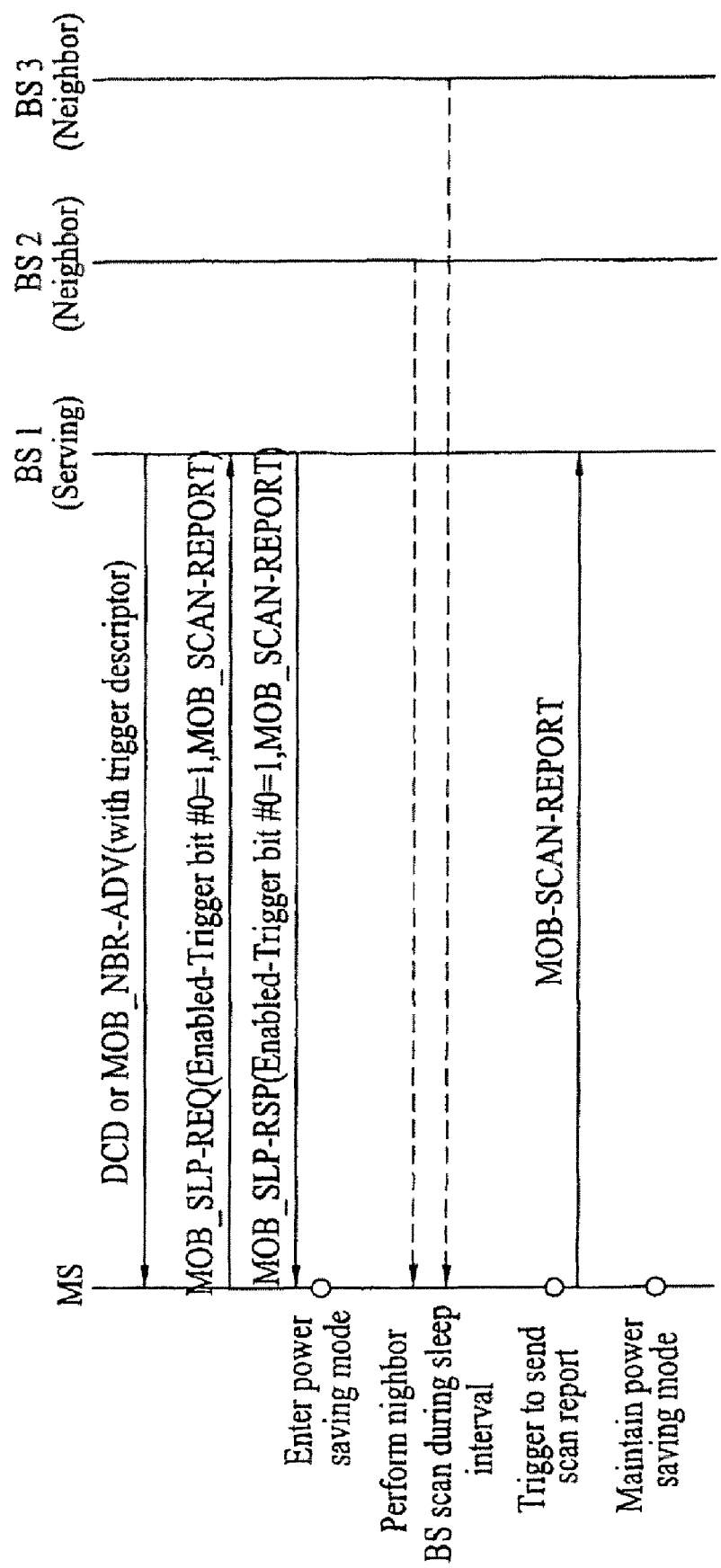
FIG. 7 illustrates an example of an operation of a power saving mode when the action for transmitting MOB_SCAN-REPORT is enabled.

FIG. 7 illustrates an example of an operation of a power saving mode when the action for transmitting MOB_SCAN-REPORT is enabled. More specifically, FIG. 7 describes operations related to handover of the MS based on handover trigger information during the operation of MS power saving mode initiated according to the Enabled-Trigger parameter.

In FIG. 7, the MS receives the handover trigger information via the DCD message or the MOB_NBR-ADV message. When making a request for entry to power saving mode, the MS sets or configures a first bit (i.e., bit #0) of the Enabled-Trigger parameter to '1,' as illustrated in Tables 8 and 9. Here, setting the first bit of the Enabled-Trigger parameter means that the action for transmitting MOB_SCAN-REPORT is enabled. Thereafter, the configured information is transmitted to the serving BS via the sleep request (MOB_SLP-REQ) message.

The serving BS then sets (or configures) the first bit (i.e., bit #0) of the Enabled-Trigger parameter to '1,' as illustrated in Tables 9 and 10, and transmits the configured information to the MS via the sleep response (MOB_SLP-RSP) message. After receiving the sleep response (MOB_SLP-RSP) message from the serving BS, the MS enters the power saving mode.

The MS which is in power saving mode can perform scan operations on neighbor base stations during the sleep interval or for the duration of the sleep window. When the MS satisfies a condition after entering the power saving mode, then the MS is required to report the scan result. Thereafter, the MS transmits the scan report (MOB_SCAN-REPORT) message to the serving BS to provide the serving BS with the scan result relating to the neighbor base stations. After reporting the scan results to the serving BS, the MS can then maintain the power saving mode.

Figure 8:
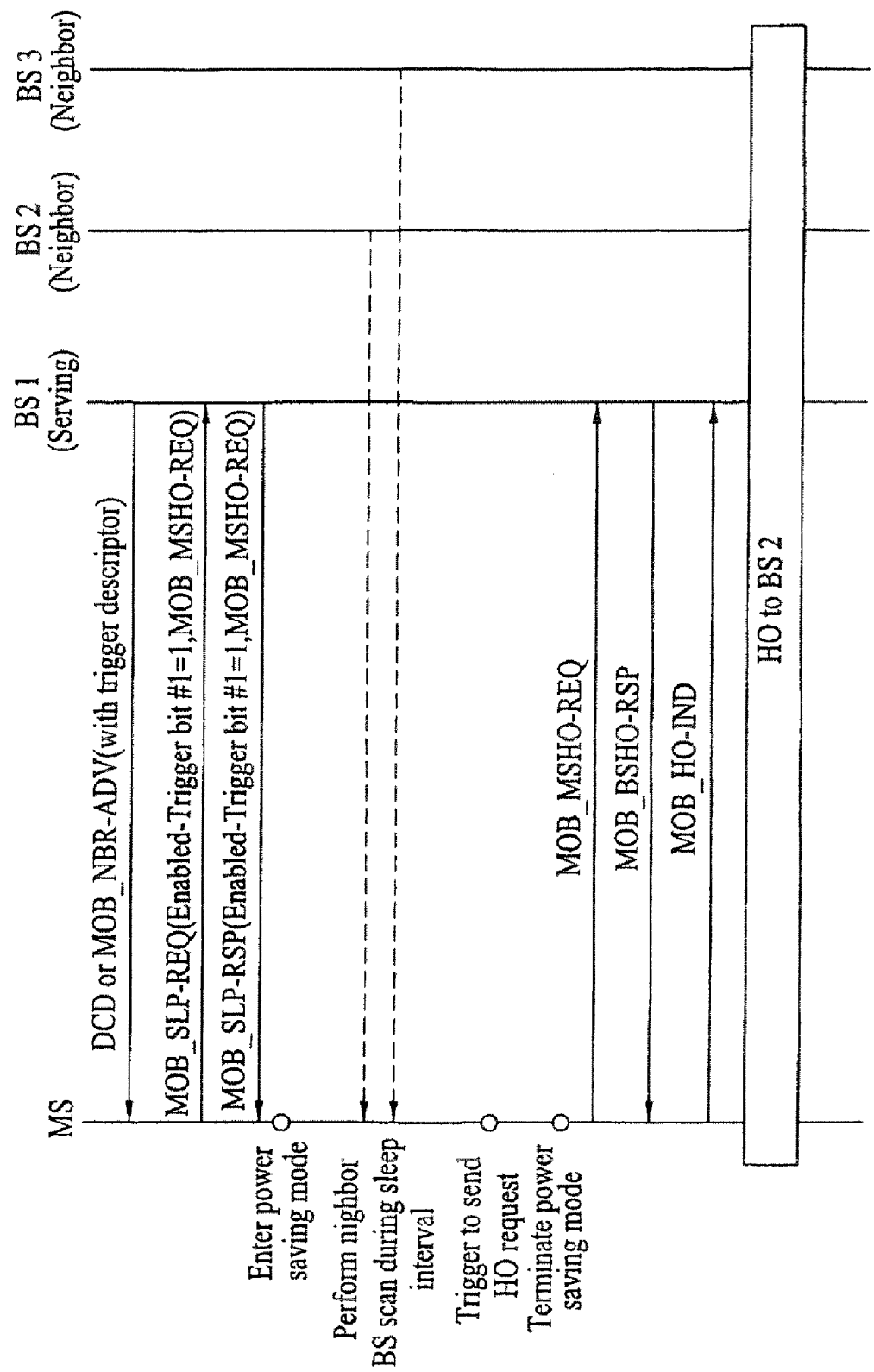
FIG. 8 illustrates an example of an operation of a power saving mode when the action for transmitting handover request message (MOB_MSHO-REQ) is enabled.

FIG. 8 illustrates an example of an operation of a power saving mode when the action for transmitting handover request message (MOB_MSHO-REQ) is enabled. As illustrate in FIG. 8, the MS receives the handover trigger information via the DCD message or the MOB_NBR-ADV message. When the MS makes a request for entry to power saving mode, the MS sets or configures a second bit (i.e., bit #1) of the Enabled-Trigger parameter to '1,' as illustrated in Tables 9 and 10. Here, setting the second bit of the Enabled-Trigger parameter means that the action for transmitting MOB_MSHO-REQ is enabled. Thereafter, the configured information is transmitted to the serving BS via the sleep request (MOB_SLP-REQ) message.

The serving BS then sets (or configures) the second bit (i.e., bit #1) of the Enabled-Trigger parameter to '1,' as illustrated in Tables 9 and 10, and transmits the configured information to the MS via the sleep response (MOB_SLP-RSP) message. After receiving the sleep response message from the serving BS, the MS enters the power saving mode.

The MS which is in power saving mode can perform neighbor BS scan operations during the sleep interval or for the duration of the sleep window. When the MS satisfies a condition after entering the power saving mode, the MS is required to report the scan result to the serving BS. Thereafter, the MS terminates the power saving mode and transmits the handover request (MOB_MSHO-REQ) message to the serving BS, thereby making a request for handover with a different BS (e.g., BS2). In response to the handover request (MOB_MSHO-REQ) message, the serving BS transmits a handover response (MOB_MSHO-RSP) message to the MS.

Thereafter, the MS requests for disconnect with the serving BS by transmitting a handover indication (MOB_HO-IND) message to the serving BS. After the disconnect, the MS performs necessary operations for entry to the target BS (i.e., BS2) and to the network.

Figure 9:
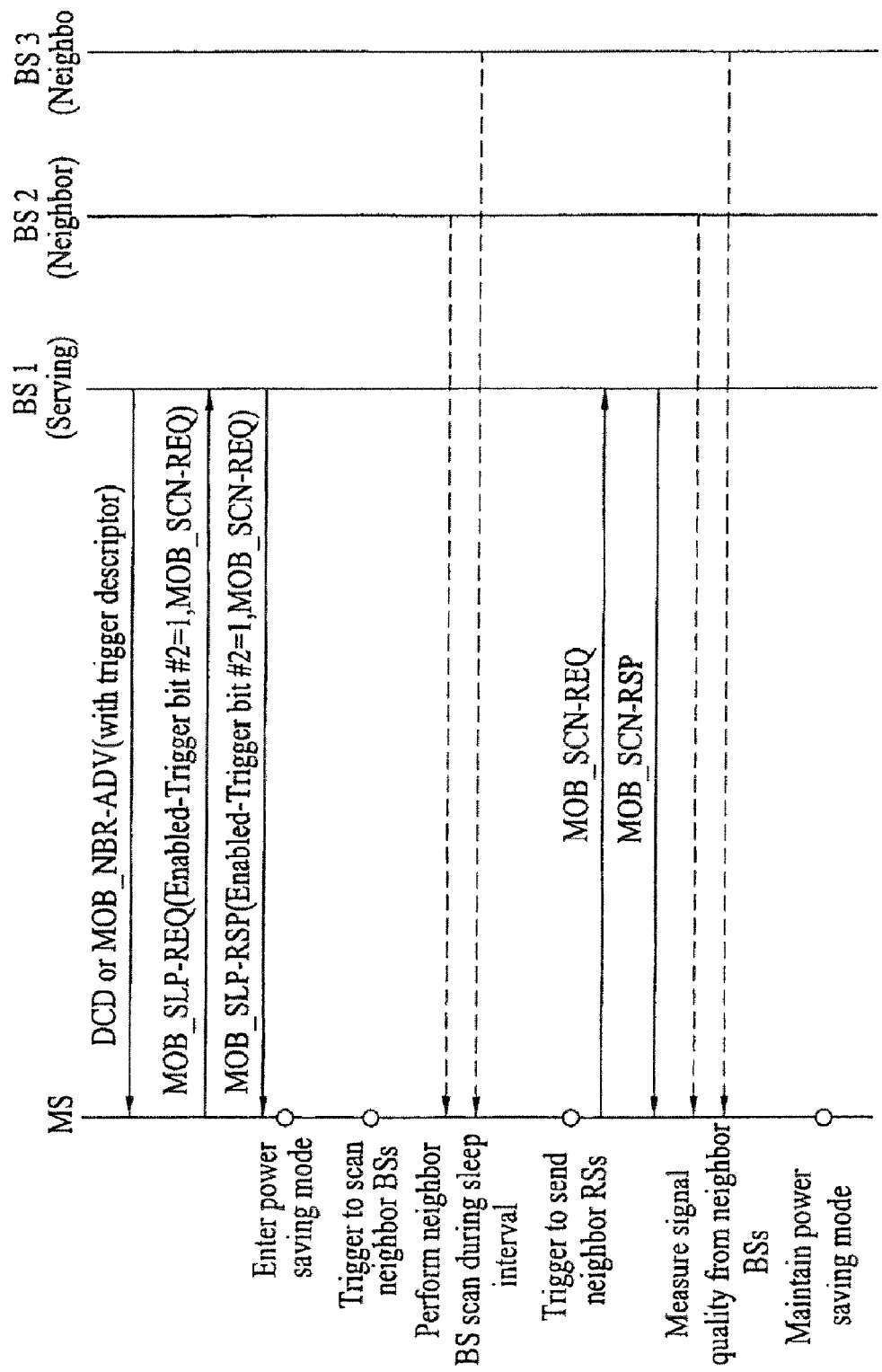
FIG. 9 illustrates an example of an operation of a power saving mode when the action for performing scan operation is enabled.

FIG. 9 illustrates an example of an operation of a power saving mode when the action for requesting a scanning interval is enabled. In FIG. 9, the MS receives the handover trigger information via the DCD message or the MOB_NBR-ADV message. When the MS makes a request to enter power saving mode, the MS sets or configures a third bit (i.e., bit #2) of the Enabled-Trigger parameter to '1,' as illustrated in Tables 8 and 9. Here, setting the third bit of the Enabled-Trigger parameter means that the action for requesting MOB_SCN-REQ is enabled. Thereafter, the configured information is transmitted to the serving BS via the sleep request (MOB_SLP-REQ) message.

The serving BS then sets (or configures) the third bit (i.e., bit #2) of the Enabled-Trigger parameter to '1,' as illustrated in Tables 9 and 10, and transmits the configured information to the MS via the sleep response (MOB_SLP-RSP) message. After receiving the sleep response message from the serving BS, the MS enters power saving mode.

When the MS satisfies a condition after entering the power saving mode, the MS is required to perform neighbor BS scan operation after. Thereafter, the MS transmits a scan request (MOB_SCN-REQ) message to the serving BS to request for allocation of scan period. In response to the scan request (MOB_SCN-REQ) message, the serving BS transmits a scan response (MOB_SCN-RSP) message including allocation of the scan period.

During the scan period, the MS synchronizes downlink signal with the neighbor base stations and measures, inter alia, signal quality from neighbor base stations, signal strengths, and transmission delay. After performing the scan operation, the MS maintains the power saving mode.

Figure 10:
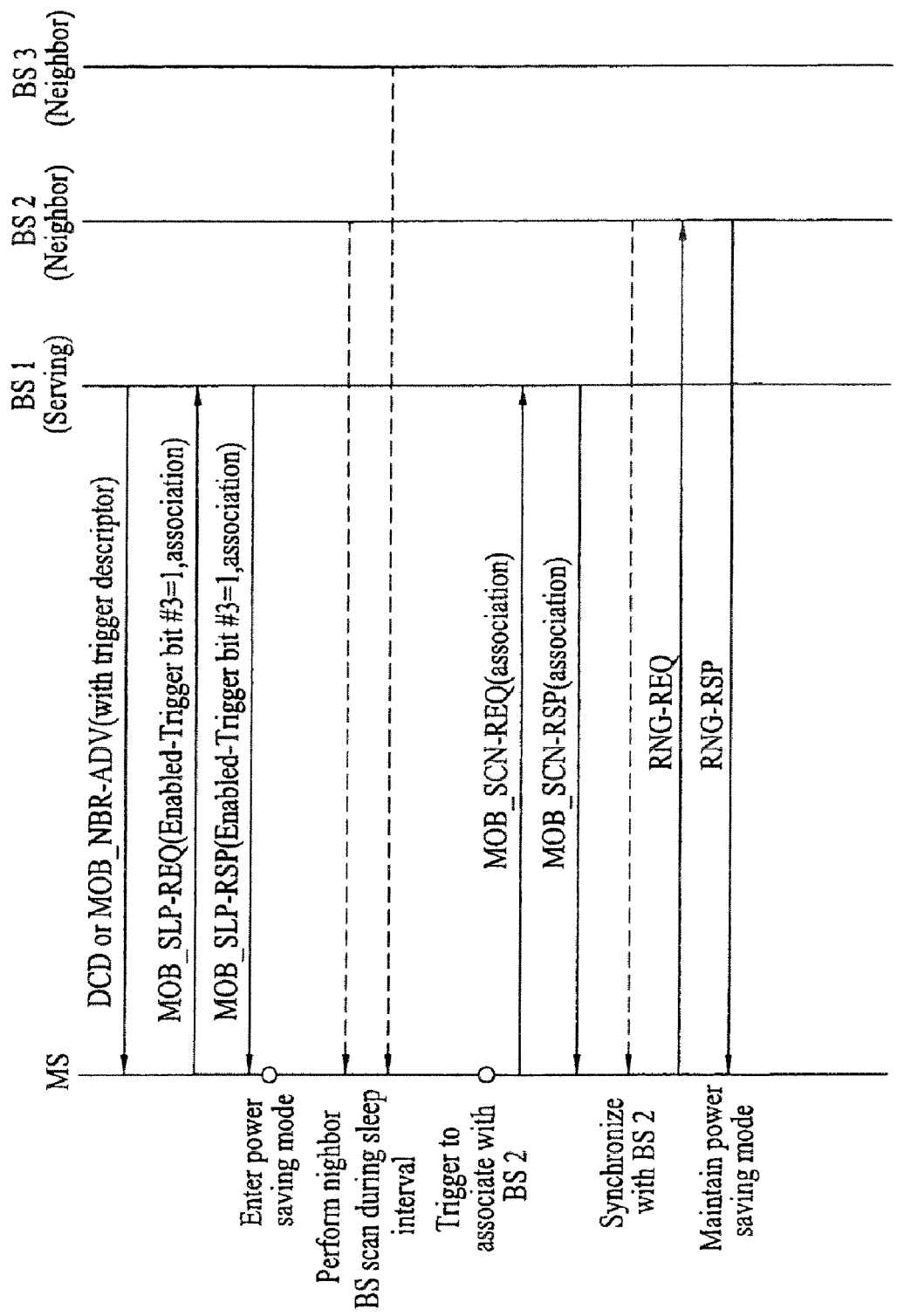
FIG. 10 illustrates an example of an operation of a power saving mode when the action for performing association is enabled.

FIG. 10 illustrates an example of an operation of a power saving mode when the event for performing association is enabled. In FIG. 10, the MS receives the handover trigger information via the DCD message or the MOB_NBR-ADV message. When the MS makes a request for entry to power saving mode, the MS sets or configures a fourth bit (i.e., bit #3) of the Enabled-Trigger parameter to '1,' as illustrated in Tables 8 and 9. Here, setting the fourth bit of the Enabled-Trigger parameter means that the action for performing association is enabled. Thereafter, the configured information is transmitted to the serving BS via the sleep request (MOB_SLP-REQ) message.

The serving BS then sets (or configures) the fourth bit (i.e., bit #3) of the Enabled-Trigger parameter to '1,' as illustrated in Tables 9 and 10, and transmits the configured information to the MS via the sleep response (MOB_SLP-RSP) message. After receiving the sleep response message from the serving BS, the MS enters power saving mode. Here, the MS that is in the power saving mode can perform neighbor BS scan operation during sleep mode.

When the MS satisfies a condition after entering the power saving mode, the MS is required to perform association with a neighbor BS (i.e., BS2). Thereafter, the MS transmits the scan request (MOB_SCN-REQ) message to the serving BS to request to perform association with the neighbor BS (i.e., BS2). In response to the scan request (MOB_SCN-REQ) message, the serving BS transmits necessary parameters for performing association with the neighbor BS (i.e., BS2) via the scan response (MOB_SCN-RSP) message. Thereafter, the MS synchronizes in uplink/downlink directions with the neighbor BS (i.e., BS2) in order to perform association.

Further, the MS transmits a ranging request (RNG-REQ) message to the neighbor BS (i.e., BS2). In response, the neighbor BS (i.e., BS2) transmits ranging control parameters along with association parameters to the MS via a ranging response (RNG-RSP) message. As a feature, the MS keeps the association parameters received from the neighbor BS (i.e., BS2) and in turn, can re-use the association parameters when performing handover with the corresponding BS. After receiving the ranging response (RNG-RSP) message, the MS maintains power saving mode.

As discussed above, the handover operation and related events performed by the MS that is in power saving mode can be enabled or disabled by using the parameters disclosed in the present invention. More specifically, whether to enable/disable can be represented in a bitmap form at the time when the MS enters power saving mode. Here, a plurality of events can be enabled or disabled as a group. In the embodiments of the present invention represent examples where the plurality of events is enabled.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for supporting a sleep mode action of a mobile station (MS) in a wireless mobile communication system, the method comprising:

receiving, in the MS, a first message comprising trigger information, wherein the trigger information includes at least one trigger condition and at least one event action comprising a handover action which is performed upon reaching the at least one trigger condition;

transmitting, from the MS, a sleep request message comprising a first enabled triggered parameter, wherein the first enabled triggered parameter includes a first bitmap comprising a first bit which is set to indicate the handover action is enabled;

receiving, in the MS, a sleep response message comprising a second enabled triggered parameter, wherein the second enabled triggered parameter includes a second bitmap comprising a second bit which is set to indicate the handover action is enabled;

entering, by the MS, a sleep mode after receiving the sleep response message;

transmitting, from the MS, a handover request message when the at least one trigger condition corresponding to the handover action is reached in the sleep mode; and receiving, in the MS, a handover response message in response to the handover request message.

2. The method of claim 1, wherein the trigger information further includes a trigger type field defined as at least a Carrier-to-Interference and Noise Ratio (CINR), a Received Signal Strength Indicator (RSSI), or a Round Trip Delay (RTD).

3. The method of claim 1, wherein the trigger information defines a trigger function which is a computation method for triggering the at least one event action.

4. The method of claim 1, wherein the first bit of the first bitmap is configured to a third bit of the first bitmap and the second bit of the second bitmap is configured to a fourth bit of the second bitmap.

5. The method of claim 1, further comprising:
transmitting, from the MS, a handover indication message indicating that the MS is about to perform the handover action to a target base station.

6. The method of claim 1, wherein the first message is a Downlink Channel Descriptor (DCD) message or a Neighbor Advertisement message.

7. A method for supporting a sleep mode action at a base station (BS) in a wireless mobile communication system, the method comprising:
transmitting, from the BS, a first message comprising trigger information, wherein the trigger information includes at least one trigger condition and at least one event action comprising a handover action which is performed upon reaching the at least one trigger condition;

receiving, in the BS, a sleep request message comprising a first enabled triggered parameter, wherein the first enabled triggered parameter includes a first bitmap comprising a first bit which is set to indicate the handover action is enabled;

transmitting, from the BS, a sleep response message comprising a second enabled triggered parameter, wherein the second enabled triggered parameter includes a second bitmap comprising a second bit which is set to indicate the handover action is enabled;

receiving, in the BS, a handover request message when a trigger condition corresponding to the handover action is reached in a sleep mode; and transmitting, from the BS, a handover respond message in response to the handover request message.

8. The method of claim 7, wherein the trigger information further includes a trigger type field defined as at least a Carrier-to-Interference and Noise Ratio (CINR), a Received Signal Strength Indicator (RSSI), or a Round Trip Delay.

9. The method of claim 7, wherein the trigger information defines a trigger function which is a computation method for triggering the at least one event action.

10. The method of claim 7, wherein the first bit of the first bitmap is configured to a third bit of the first bitmap and the second bit of the second bitmap is configured to a fourth bit of the second bitmap.

11. The method of claim 7, further comprising:
receiving, in the BS, a handover indication message indicating that a mobile station is about to perform the handover action to a target base station.

12. The method of claim 7, wherein the first information is a Downlink Channel Descriptor (DCD) message or a Neighbor Advertisement message.

13. A mobile station performing a sleep mode action in a wireless mobile communication system, wherein the mobile station is configured for:
receiving a first message comprising trigger information, wherein the trigger information includes at least one trigger condition and at least one event action comprising a handover action which is performed upon reaching the at least one trigger condition;

transmitting a sleep request message comprising a first enabled triggered parameter, wherein the first enabled triggered parameter includes a first bitmap comprising a first bit which is set to indicate the handover action is enabled;

receiving a sleep response message comprising a second enabled triggered parameter, wherein the second enabled triggered parameter includes a second bitmap comprising a second bit which is set to indicate the handover action is enabled;

entering a sleep mode after receiving the sleep response message;

transmitting a handover request message when the at least one trigger condition corresponding to the handover action is reached in the sleep mode; and receiving a handover response message in response to the handover request message.

14. The mobile station of claim 12, wherein the trigger information further includes a trigger type field defined as at least one of Carrier-to-Interference and Noise Ratio (CINR), a Received Signal Strength Indicator (RSSI), and a Round Trip Delay (RTD).

15. The mobile station of claim 13, wherein the first bit of the first bitmap is configured to a third bit of the first bitmap and the second bit of the second bitmap is configured to a fourth bit of the second bitmap.

16. The mobile station of claim 13, further configured for:
transmitting a handover indication message indicating that the MS is about to perform the handover action to a target base station.

17. The mobile station of claim 13, wherein the first message is a Downlink Channel Descriptor (DCD) message or a Neighbor Advertisement message.

18. A base station (BS) supporting a sleep mode action in a wireless mobile communication system, wherein the base station is configured for:
transmitting a first message comprising trigger information, wherein the trigger information includes at least one trigger condition and at least one event action comprising a handover action which is performed upon reaching the at least one trigger condition;

receiving a sleep request message comprising a first enabled triggered parameter, wherein the first enabled triggered parameter indicates a handover action;

transmitting a sleep response message comprising a second enabled triggered parameter, wherein the second enabled triggered parameter indicates the handover action;

receiving a handover request message when a trigger condition corresponding to the handover action is reached in a sleep mode; and transmitting a handover response message in response to the handover request message.

19. The base station of claim 18, wherein the trigger information further includes a trigger type field defined as at least a Carrier-to-Interference and Noise Ratio (CINR), a Received Signal Strength Indicator (RSSI), or a Round Trip Delay (RTD).

20. The base station of claim 18, wherein:

the first enabled trigger parameter includes a first bitmap comprising a first bit and the second enabled trigger parameter includes a second bitmap comprising a second bit, and the first and second bits are set to indicate that the handover action is enabled, and wherein the first bit is configured to a third bit of the first bitmap and the second bit is configured to a fourth bit of the second bitmap.

21. The base station of claim 18, further configured for:

receiving a handover indication message indicating that a mobile station is about to perform the handover action to a target base station.

22. The base station of claim 18, wherein the first message is a Downlink Channel Descriptor (DCD) message or a Neighbor Advertisement message.

* * * * *